Patented Aug. 12, 1930

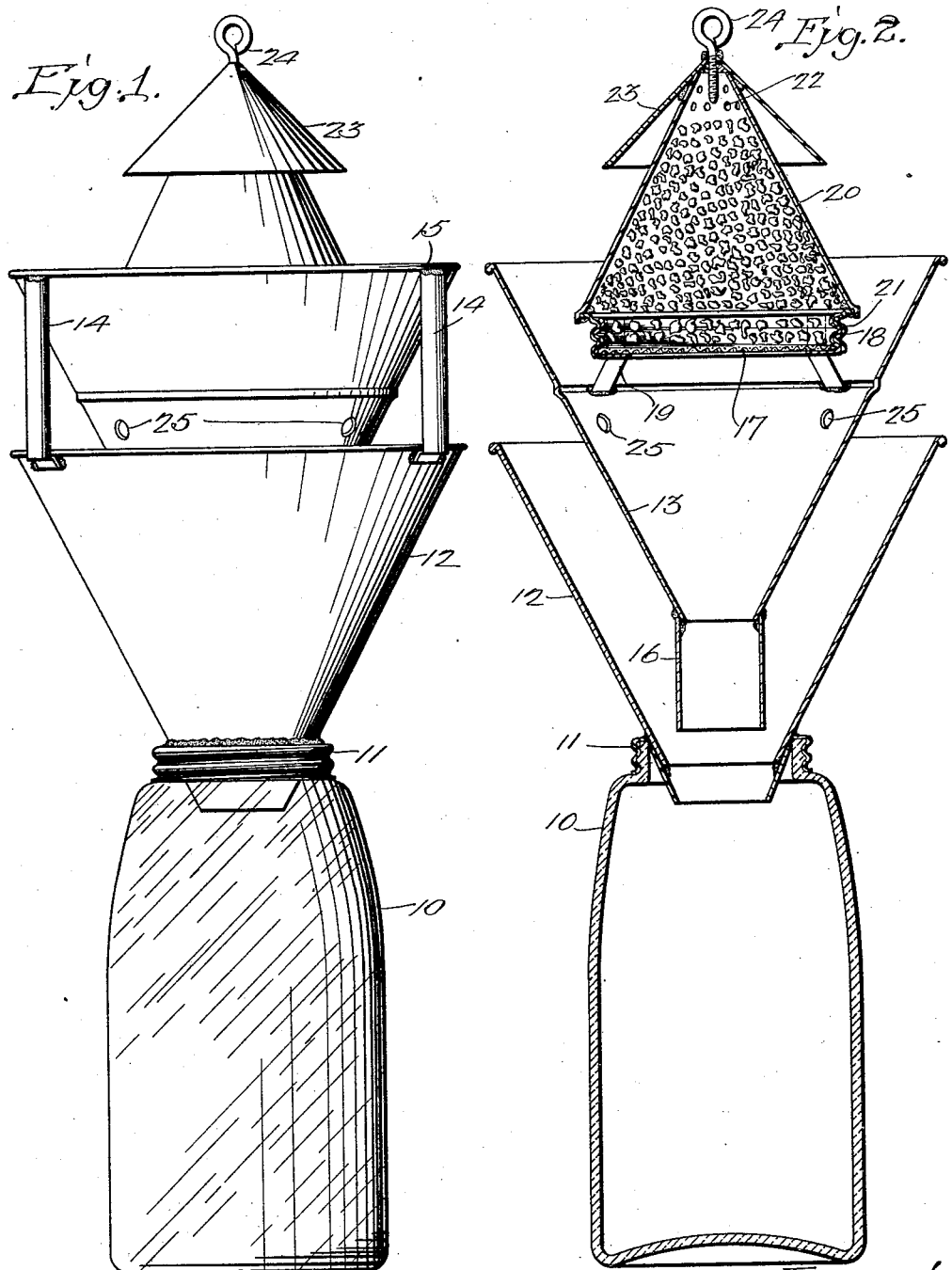

1,772,989

UNITED STATES PATENT OFFICE

WILLIAM S. EMLEY, OF PHILADELPHIA, PENNSYLVANIA

INSECT TRAP

Application filed November 9, 1929. Serial No. 406,044.

This invention relates to insect traps and more particularly to an insect trap for trapping heavy-bodied insects or insects which are attracted by scent and seek to escape by dropping flight.

An important object of the invention is to provide an insect trap of this character having the largest possible entrance area while still providing a trap which will not permit escape of the insect after it has entered the trapping area.

Among the insects included in the general class above designated are Japanese beetles which have proven extremely destructive. These insects fly very rapidly and on contact seek to escape by closing the wings and dropping. Ordinarily the dropping flight is extremely short and the insect attempts to resume the horizontal flight substantially immediately. Accordingly, an important and specific object of this invention is the provision of a trap having entrance, or trapping areas, in which the beetle may fall when, in following a scent, he comes into contact with an obstruction, and in which a plurality of such entrances may be provided without providing sufficient room to enable the beetle to resume its flight.

A further object of the invention is to provide in a construction of this character an arrangement such that the area of diffusion of a scent bait may be materially increased and the entire trapping area covered thereby.

A still further object of the invention is the provision of a construction such that the scent bait may be readily replaced when it deteriorates, while the bait is protected from weather at all times.

A still further object of the invention is to provide a structure enabling the use of the ordinary commercial funnel in the manufacture of the trap.

Another object is the improvement of the structure shown in my prior application for insect trap, Serial No. 218,484, filed September 9, 1927, of which this application is a continuation in part.

These and other objects I attain by the construction shown in the accompanying drawings wherein, for the purpose of illustration, I have shown a preferred embodiment of my invention and wherein:

Fig. 1 is a side elevation of an insect trap constructed in accordance with my invention; and Fig. 2 is a vertical sectional view therethrough.

Referring now more particularly to the drawings, the numeral 10 generally designates a receptacle preferably a Mason or other screw-top jar having a cap element 11 threaded thereon. The cap element is centrally apertured and has secured in this aperture the smaller end of a funnel 12 which may comprise a commercial funnel of desired size from which the spout end is preferably removed.

Supported from funnel 12 in spaced coaxial relation thereto is a second funnel 13, the support being at present illustrated as comprising vertically-extending bars 14 secured at their upper ends to the funnel 13 and at their lower ends to the funnel 12 by soldering as indicated at 15. Any other suitable means for providing for the spacing of these funnels may be employed. Funnel 13, for a purpose presently to appear, has at its lower end a depending spout structure 16 the lower end of which terminates in fairly close relation to the walls of the funnel 12, the spacing being just sufficient to permit ready passage of insect bodies therebetween.

In the mouth of funnel 13 a bait holder generally is disposed. This bait holder comprises a base including a foraminous bottom 17 and an upstanding rim 18 preferably formed to produce screw threads. Extending downwardly and outwardly from the rim are supporting legs 19 the lower ends of which are secured to the inner face of the funnel wall.

A conical container 20 is provided, having at its larger end a flange 21 for engagement with and attachment to the flange 18 of the base in the present shown as screw threaded for engagement therewith. The upper or smaller end of this receptacle is perforated as indicated at 22 and secured to the smaller end is a conical hood 23 projecting outwardly and downwardly over the perforated section to prevent entry of direct moisture in the perforations thereof. An eye 24 is preferably provided at the upper end of the bait container to afford a support from which the entire trap may be hung. The walls of funnel 13 are perforated at spaced intervals in an annular series as indicated at 25, these perforations being preferably located slightly above the level of the upper end of funnel 12.

In use of the trap, insects approaching the trap at a point between the upper edge of funnel 12 and the upper end of the bait receptacle are within the trapping area and coming into contact with portions of the trap close their wings and drop in an attempt to escape. Those entering the upper end of funnel 13 pass between the bait receptacle and the inner wall of this funnel and so downwardly through the spout 16 and into receptacle 10. The space between the base of the bait receptacle and the outlet spout, while possibly affording sufficient space for circulatory flight on the part of the insect, has a restricted outlet mouth and this outlet is further barred by the supports 19 which would interfere seriously with circulatory flight and so prevent escape of the insect which when coming in contact with the bars would again close its wings and drop to escape this new obstruction. Insects entering the trap between the upper end of funnel 12 and the upper end of funnel 13 will fall into the space between the funnels and this space is restricted by the spout at the lower end thereof so that no flying space is provided for the resumption of flight.

It will be obvious that while only two funnels have been illustrated, any desired number of funnels may be employed and the addition of further funnels will increase the trapping area. The use of two funnels is, however, preferred as this construction gives a relatively large trapping area due to the increased spacing of the funnels possible with the use of spout 16 and a proper distribution of the scent may be had over the entire trapping area.

Since the construction illustrated is capable of a certain range of change and modification without materially departing from the spirit of my invention, I do not wish to be understood as limiting myself thereto except as hereinafter claimed.

I claim:

1. An insect trap including a container having detachably fixed thereto a plurality of superposed inverted cones, spacing elements for said cones, whereby said cones are spaced from each other, said spacing elements defining spaces providing additional, substantially direct means of ingress to the lower of said superposed cones, and a bait receptacle mounted in spaced relation to the upper cone.

2. An insect trap comprising a container, an inverted cone detachably mounted in the said container and extending upwardly therefrom, and a second cone mounted inside of the said first cone in spaced relation thereto, the spacing being such as to provide lateral, substantially direct means of ingress to said first cone.

3. An insect trap comprising a container, an inverted conical sheet metal body having an opening in the smaller end detachably mounted in the said container and projecting upwardly therefrom, a second inverted conical sheet metal body similar to the first body spacing elements attached to the second body and mounted on the first body to secure them in spaced relation, the spacing elements defining a plurality of substantially direct lateral means of ingress to the first body superposed above it and a conical bait receptacle mounted in the top of the said superposed body.

4. An insect trap comprising a container, an inverted cone mounted on said container, a second inverted cone mounted in spaced relation to the first cone, spacers between the cone, said spacers defining substantially direct lateral means of ingress to the first cone.

5. An insect trap comprising a container, a funnel mounted on said container, a second funnel superimposed upon the first funnel, supports connecting the upper ends of the first and second funnels and maintaining them in vertically spaced relation, said supports being spaced to provide substantially direct means of ingress to the first-named funnel.

6. An insect trap comprising a container, a funnel mounted on said container, a second funnel superimposed upon the first funnel, supports connecting the upper ends of the first and second funnels and maintaining them in vertically spaced relation, said supports being spaced to provide substantially direct means of ingress to the first-named funnel, the last-named funnel having a spout the lower end of which is in such proximity to the inner face of the first-named funnel that an annular insect entrance is provided.

7. An insect trap comprising a container, a funnel mounted on said container, a second funnel superimposed upon the first funnel, supports connecting the upper ends of the first and second funnels and maintaining them in vertically spaced relation, said supports being spaced to provide substantially direct means of ingress to the first-named funnel, and means extending downwardly from the lower end of the last-named funnel and into the space between the last-named funnel and the lower end of the first-named funnel interrupting said space to prevent the formation of flying room.

8. An insect trap comprising a container, a funnel mounted on said container, a second funnel superimposed upon the first funnel, supports connecting the upper ends of the first and second funnels and maintaining them in vertically spaced relation, said supports being spaced to provide substantially direct means of ingress to the first-named funnel, a bait carrier supported from the last-named funnel and apertures in said bait carrier.

9. An insect trap comprising a container, a funnel mounted on said container, a second funnel superimposed upon the first funnel, supports connecting the upper ends of the first and second funnels and maintaining them in vertically spaced relation, said supports being spaced to provide substantially direct means of ingress to the first-named funnel, a bait carrier supported from the last-named funnel and apertures in said bait carrier and in the wall of the last-named funnel.

10. In an insect trap, a funnel, a receptacle into which the funnel discharges, a bait carrier supported from the funnel comprising a base including a foraminous bottom and a flange and a receptacle detachably engaged with said flange having openings adjacent the upper end thereof.

11. In an insect trap, a funnel, a receptacle into which the funnel discharges, a bait carrier supported from the funnel comprising a base including a foraminous bottom and a flange, a receptacle detachably engaged with said flange having openings adjacent the upper end thereof, and a protecting hood carried by said receptacle and extending over said opening.

WILLIAM S. EMLEY.